(12) United States Patent
Chennaux et al.

(10) Patent No.: US 12,108,875 B2
(45) Date of Patent: Oct. 8, 2024

(54) MODULAR AND SCALEABLE FURNITURE (71) Applicants: Alain Chennaux, Brussels (BE); Odile Chennaux, Brussels (BE)

(72) Inventors: Alain Chennaux, Brussels (BE); Odile Chennaux, Brussels (BE)

(73) Assignees: Alain Chennaux, Brussels (BE); Odile Chennaux, Brussels (BE)

( * ) Notice: Subject to any disclaimer, the term of this patent is extended or adjusted under 35 U.S.C. 154(b) by 20 days.

(21) Appl. No.: 17/757,198

(22) PCT Filed: Oct. 13, 2020

(86) PCT No.: PCT/EP2020/078781
§ 371 (c)(1),
(2) Date: Jun. 10, 2022

(87) PCT Pub. No.: WO2021/121712
PCT Pub. Date: Jun. 24, 2021

(65) Prior Publication Data
US 2023/0000248 A1 Jan. 5, 2023

(30) Foreign Application Priority Data
Dec. 20, 2019 (FR) ...................... 1915036

(51) Int. Cl.
A47B 47/04 (2006.01)
(52) U.S. Cl.
CPC .......... A47B 47/047 (2013.01); A47B 47/042 (2013.01); A47B 2230/0092 (2013.01)

(58) Field of Classification Search
CPC ................ A47B 47/047; A47B 47/042; A47B 2230/0092; A47B 2230/0085;
(Continued)

(56) References Cited

U.S. PATENT DOCUMENTS 1,363,138 A * 12/1920 Markham ............... A47B 65/10
248/172
2,366,677 A * 1/1945 Rosenthal ............ A47B 47/042
108/180

(Continued)

FOREIGN PATENT DOCUMENTS

EP 1645713 A2 4/2006

OTHER PUBLICATIONS

Search Report from the French Intellectual Property Office on corresponding FR application dated Aug. 19, 2020.
(Continued)

Primary Examiner — Jennifer E. Novosad
(74) Attorney, Agent, or Firm — Alumen IP Law PC (57) ABSTRACT The furniture having, between two lower and upper boards, each having two parallel planar surfaces and two front and rear edges, a module with one or two side walls, each having two upper and lower edges, and a rear back wall with two upper and lower edges, assembled to the side walls. The module can slide and be guided along the boards. One of the edges of each board having a longitudinal rib protruding perpendicular to its planar surfaces. The module is notched longitudinally and perpendicular to its side walls so as to slot onto the ribs of the boards and thus slide along these ribs.

28 Claims, 5 Drawing Sheets (58) Field of Classification Search
CPC ..... A47B 87/0276; A47B 87/02; A47B 65/15; A47B 65/10; A47B 96/025; A47B 47/028; A47B 47/027; F16B 12/125
USPC .......................................... 211/183, 184, 43
See application file for complete search history.

(56) References Cited

U.S. PATENT DOCUMENTS

| | | | | | |
|---|---|---|---|---|---|
| 3,069,216 | A * | 12/1962 | Vaeth | ............. | A47B 47/042 312/265.5 |
| 3,410,441 | A * | 11/1968 | Rhyne | ............. | A47B 88/941 312/263 |
| 3,552,817 | A * | 1/1971 | Marcolongo | ............. | A47B 87/02 312/107 |
| 3,612,289 | A * | 10/1971 | Zink | ............. | F16B 12/46 211/187 |
| 3,722,971 | A * | 3/1973 | Zeischegg | ............. | A47B 87/0276 312/109 |
| 3,822,924 | A * | 7/1974 | Lust | ............. | A47B 47/0041 312/263 |
| 3,966,337 | A * | 6/1976 | Crawford | ............. | A47C 4/021 312/257.1 |
| 4,153,311 | A * | 5/1979 | Takahashi | ............. | A47B 47/042 312/265.5 |
| 4,232,916 | A * | 11/1980 | Correia | ............. | A47B 87/0207 312/265.5 |
| 4,595,105 | A * | 6/1986 | Gold | ............. | A47B 47/00 211/184 |
| 4,832,421 | A * | 5/1989 | Shoffner | ............. | A47B 47/042 312/265.5 |
| 4,988,003 | A * | 1/1991 | Spitzer | ............. | A47B 87/0207 220/23.6 |
| 5,046,789 | A * | 9/1991 | Lee | ............. | A47B 87/0276 52/270 |
| 5,185,982 | A * | 2/1993 | Hostetler | ............. | F16B 12/00 403/219 |
| 5,454,331 | A * | 10/1995 | Green | ............. | F16B 12/20 297/440.13 |
| 5,566,839 | A * | 10/1996 | Muller | ............. | A47B 49/004 211/144 |
| 5,590,824 | A * | 1/1997 | Weeks | ............. | B60R 7/02 224/42.32 |
| 6,174,116 | B1 * | 1/2001 | Brand | ............. | B60P 7/14 410/121 |
| 6,532,878 | B2 * | 3/2003 | Tidemann | ............. | A47B 47/042 108/186 |
| 6,595,378 | B2 * | 7/2003 | Wang | ............. | A47B 47/0075 211/186 |
| 6,732,858 | B1 * | 5/2004 | Chang Ou | ............. | A47B 87/0276 220/23.6 |
| 7,533,940 | B1 * | 5/2009 | Zook | ............. | A47B 83/02 297/440.13 |
| 8,832,917 | B1 * | 9/2014 | Elliott | ............. | A47C 4/021 403/345 |
| 9,909,604 | B1 * | 3/2018 | Fawcett | ............. | F16B 12/10 |
| 10,016,056 | B2 * | 7/2018 | Sklansky | ............. | A47B 47/0008 |
| 10,174,497 | B2 * | 1/2019 | Perez-Romero | ............. | E04B 1/2604 |
| 11,590,401 | B2 * | 2/2023 | Teasdale | ............. | A63B 71/0036 |
| 2005/0252425 | A1 * | 11/2005 | Dardashti | ............. | F16B 12/26 108/101 |
| 2005/0274681 | A1 * | 12/2005 | Rivers | ............. | A47B 65/10 211/43 |
| 2008/0302279 | A1 * | 12/2008 | Clifton | ............. | A47B 47/042 108/180 |
| 2011/0241505 | A1 * | 10/2011 | Tashjian | ............. | A47B 96/14 312/198 |
| 2014/0373357 | A1 * | 12/2014 | Elliott | ............. | A63H 33/084 29/897 |
| 2020/0275773 | A1 * | 9/2020 | Berger | ............. | A47B 47/047 |
| 2023/0000248 | A1 * | 1/2023 | Chennaux | ............. | A47B 47/042 |
| 2023/0127328 | A1 * | 4/2023 | Chennaux | ............. | A47B 47/04 312/263 |

OTHER PUBLICATIONS

International Search Report and Written Opinion on corresponding PCT application (PCT/EP2020/078781) from International Searching Authority (EPO) dated Dec. 18, 2020.

* cited by examiner

MODULAR AND SCALEABLE FURNITURE

TECHNICAL FIELD

The field of the invention of the present application is that of furniture or shelves for storing or displaying many and varied objects, such as books—in this case, bookcases—, knick-knacks—in this case, showcases or display units—, perfume bottles—in this case, pianos—, etc. More particularly, the furniture in question comprises a plurality of modules which are slidably mounted on boards—floors, ceilings or dividers—in order to be able to modify and develop the storage or display structure of this furniture.

More generally, the field of the invention is therefore that of furniture for storing and displaying objects which are modular and capable of changing by sliding along two low and high boards, each having two front and rear edges, of modules comprising front edges and low and high rear edges, these boards and modules being arranged to ensure guiding of the modules along the boards.

Such furniture is described in Belgian patent 2018/5324.

Making and mounting the modules and boards of this prior art is not the easiest.

SUMMARY

The inventors have therefore sought a particularly simple solution for making a modular and scaleable storage structure that is easy to manufacture and to change, and this is how they provide the invention of the present application, which consists of a modular and scaleable piece of furniture comprising, at least between two low and high boards each having two front and rear edges, at least one module with at least one side wall, provided with two low and high edges, and a rear bottom wall having two low and high edges and assembled to the side wall, the boards and the module being arranged to allow sliding and guiding of the module along the boards, the piece of furniture wherein the boards having two parallel planar surfaces,
at least one of the edges of each board comprises a longitudinal rib projecting perpendicular to its planar surfaces,
the module is indented longitudinally and perpendicular to its side wall in order to be able to fit onto the ribs of the boards and thus slide along these ribs.

It should be noted at once that the material of the boards and the module, which may be metal for example, is advantageously wood or another material that can be cut and machined.

In the case where only one of the edges of the boards comprises a rib, the boards can be either a low board or a high board, depending on whether they are presented with the rib facing up or down, it being understood that the boards will have to be turned so that their rib is that of a rear edge.

With a single rib, forming, in profile, an L with the board, said board can be a low board or a high board, but then, in the latter case, without any other additional board above this high board, to form only a single-module set or a single row of modules.

If the piece of furniture is to comprise at least two superimposed rows of modules separated by an intermediate board, then this intermediate board comprises two projecting longitudinal ribs, perpendicular to the planar surfaces of this board, as an extension of each other and forming, in profile, a T with the board.

The longitudinal ribs projecting out of the boards may have a flank that is coplanar with the rim of the edge of the boards or may be recessed with respect to this rim.

In one embodiment, with the bottom wall assembled to the rear edge of the side wall, the module is indented in two longitudinal grooves formed respectively in the low and high edges of the bottom wall and extending into the low and high edges of its side wall to cooperate with the ribs of the low and high boards.

Of course, the module may comprise two side walls assembled to the bottom wall, the above characteristics naturally applying mutatis mutandis to this embodiment, the module thus comprising two side walls each provided with two low and high edges, and a rear bottom wall having two low and high edges and assembled to the side walls. In this case, and the bottom wall being assembled to the rear edges of the side walls, the module can be indented in two notches formed respectively in at least one of the low and high edges of its two side walls, with a depth equal to the height of the projecting ribs of the boards, preferably near its bottom wall, and aligned parallel to the bottom wall.

In the case where the module comprises only one side wall, it is preferable that the bottom wall be assembled to the side wall below its rear edge.

Advantageously, in the latter case, the material of the module being preferably wood, the module comprises, in the rear dihedral for assembling the bottom wall and the side wall, a buttress extending between the high and low edges of the bottom and side walls and indented into two longitudinal notches formed respectively in its high and low edges and extending, in the rear edge of the side wall, projecting out of the bottom wall, at the top and bottom, to cooperate with the ribs of the high and low boards.

In this case, it is preferable that the edge of the bottom wall, opposite its edge for assembling with the side wall, is provided with a bar indented at the top and bottom, for cooperation with the ribs of the high and low boards, the bar extending in line with the buttress.

In the case where the module has only one side wall, with a bottom wall disposed below the rear edge of the side wall, and its material is metal, the two walls may be welded together or formed as a single bent piece.

The present application also relates to a piece of furniture comprising more than two boards and/or at least two modules as claimed above.

BRIEF DESCRIPTION OF THE DRAWINGS

The invention will be better understood upon reading the following description of several embodiments of the piece of furniture of the invention, with reference to the appended drawings in which.

DETAILED DESCRIPTION

The modular piece of furniture, which is scaleable as specified below, of FIG. 1 comprises, between a low board 1 and a high board 2, a single row of two modules 3 and 4. The boards and the walls of the modules are here made of wood.

Each board 1, 2 comprises a front edge 5 and a rear edge 6, delimiting two parallel planar surfaces 7, 8.

A thin slat 10, here also made of wood, is attached to the entire rim 9 of the rear edge 6 of the boards 1, 2, projecting upwards and downwards perpendicular to the planar surfaces 7, 8 of the boards 1, 2. In functional terms, each slat 10 is formed by two half-slats as an extension of each other and forming upper 11 and lower 12 longitudinal ribs projecting perpendicular to the planar surfaces 7, 8 of the boards 1, 2. In profile, the two ribs 11, 12 of each slat 10 form, with the board to which they are attached, a T. The slats are preferably attached to their board by bonding.

Figure 1:
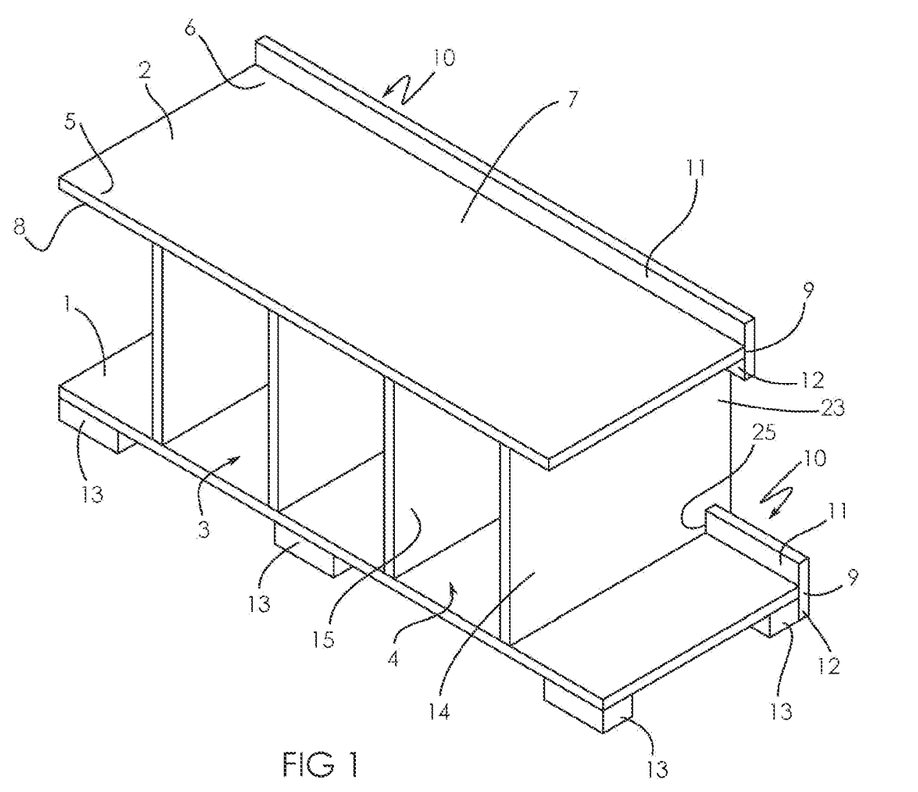
FIG. 1 is a top perspective view of the left side of an embodiment of the piece of furniture of the invention, with a single row of two modules of a first embodiment between two low and high boards of a first embodiment.
Figure 2:
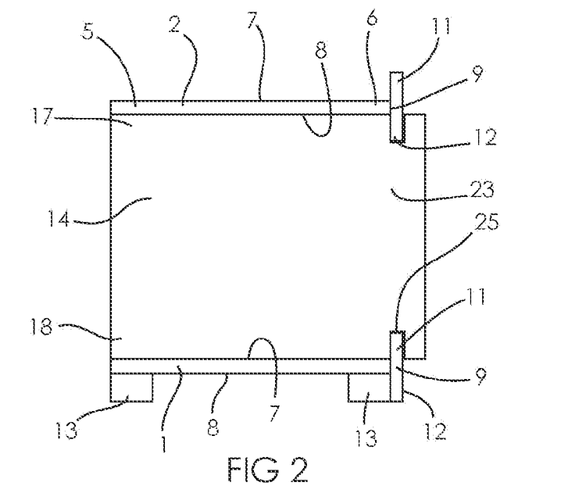
FIG. 2 is a view of the left side of the piece of furniture of FIG. 1.

It should be noted that the high board 2 of the furniture in FIG. 1 comprises an upper rib 11, so that it can be used as an intermediate board when transforming the piece of furniture in FIG. 1 into a piece of furniture with two or more rows of modules, with the board 2 becoming the low board to support the modules of the second row.

Leaving aside this upper rib, which in this case is effectively useless, the lower rib 12 forms, in profile, an L with the board 2.

Similarly, the lower rib 12 of the low board 1 is not useful here either. It is therefore for convenience and simplicity that the slats 10 have been attached to the boards.

In the case where only one rib (a half-slat) is attached to the boards, it is interesting to note that they can be attached either as a lower or an upper rib, since it would be sufficient to rotate the boards around an axis orthogonal to their rib to transform a lower rib into an upper rib, and vice versa, and thus to transform a high board into a low board, all ribs having to remain attached to the rear edge of the boards.

In the case of a board provided with only one lower rib, as will be easily understood below, the board can only be a high board of a piece of furniture with a single row of modules.

The piece of furniture in FIG. 1 comprises support shoes under the low board 1 which have been provided to improve the seat of the piece of furniture and to take into account the fact that this low board also comprises a lower rib 12, a series of shoes 13 being pressed against this rib and the rear edge 6 of the board, other shoes 13 being attached under the front edge 5 of the board, the shoes 13 having of course the same height as the rib 12.

Each module 3, 4 comprises here a left side wall 14, a right side wall 15 and a rear bottom wall 16.

Each side wall comprises a high edge 17 and a low edge 18. Similarly, the rear bottom wall 16 comprises a high edge 19 and a low edge 20. The two side walls 14, 15, by their vertical rear edge 23, are assembled to the rear bottom wall 16. This structure is clearly visible in FIG. 3.

Figure 3:
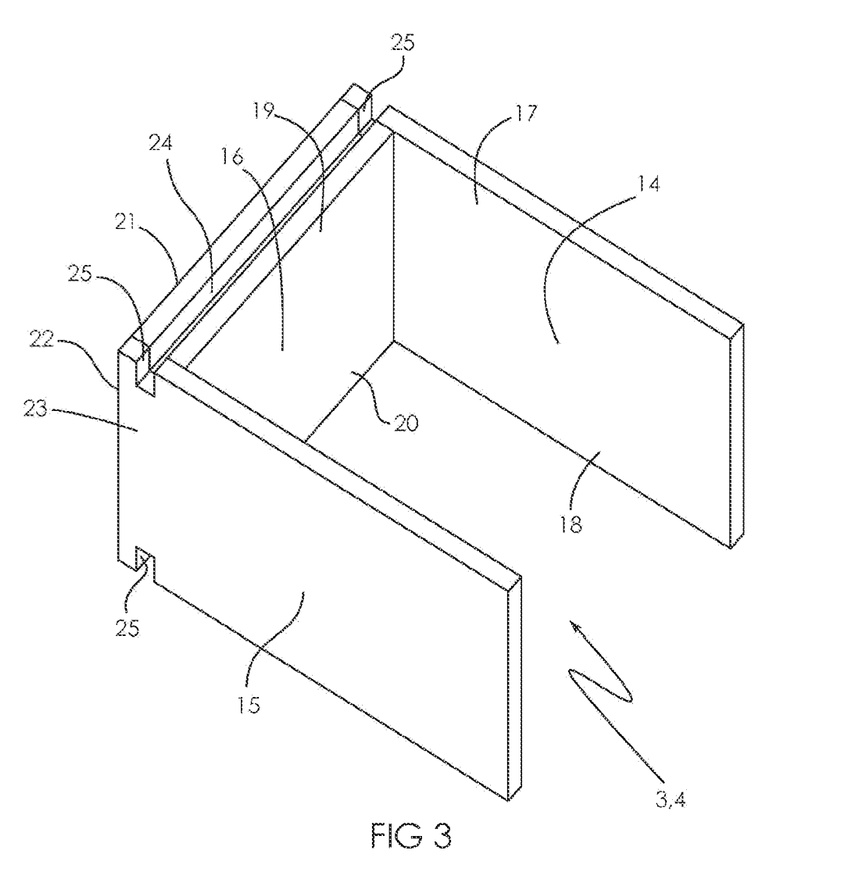
FIG. 3 is a top perspective view of one of the modules of the piece of furniture of FIG. 1, with two side walls and a bottom wall assembled to the rear edges of the side walls.

The three walls of the modules 3, 4 can be assembled in different ways. First of all, and here, they are bonded to each other.

In this case, the rear bottom wall 16 is disposed between the two side walls, the rear face 21 of the bottom wall being coplanar with the rear rims 22 of the vertical rear edges 23 of the side walls 14, 15. The front face of the bottom wall could also be disposed against these rear rims.

The modules 3, 4 are indented longitudinally, that is in the direction of the length of the piece of furniture, and thus in the direction of the length of the boards 1, 2, and perpendicular to the side walls 14, 15.

An indentation has been made both in the rear bottom wall 16 and in the two side walls 14, 15.

In the rear bottom wall 16, a groove 24 has been cut into the high 19 and low 20 edges. These grooves 24 have substantially the same thickness as the slats 10 and a depth substantially equal to the height of the ribs 11, 12.

The grooves 24 are extended in the side walls 14, 15 by notches 25 made here in their high edges 17, low edges 18 and vertical rear edges 23. The notches 25 have the same thickness and depth as the grooves 24.

Thus, the walls 14, 15, 16 of the modules 3, 4 can fit onto the ribs 11, 12 of the boards 1, 2 and slide along these ribs. The modules can be placed anywhere. They can, without changing their structure, be moved after the first installation and this is why the furniture is described as modular and scaleable furniture.

Figure 6:
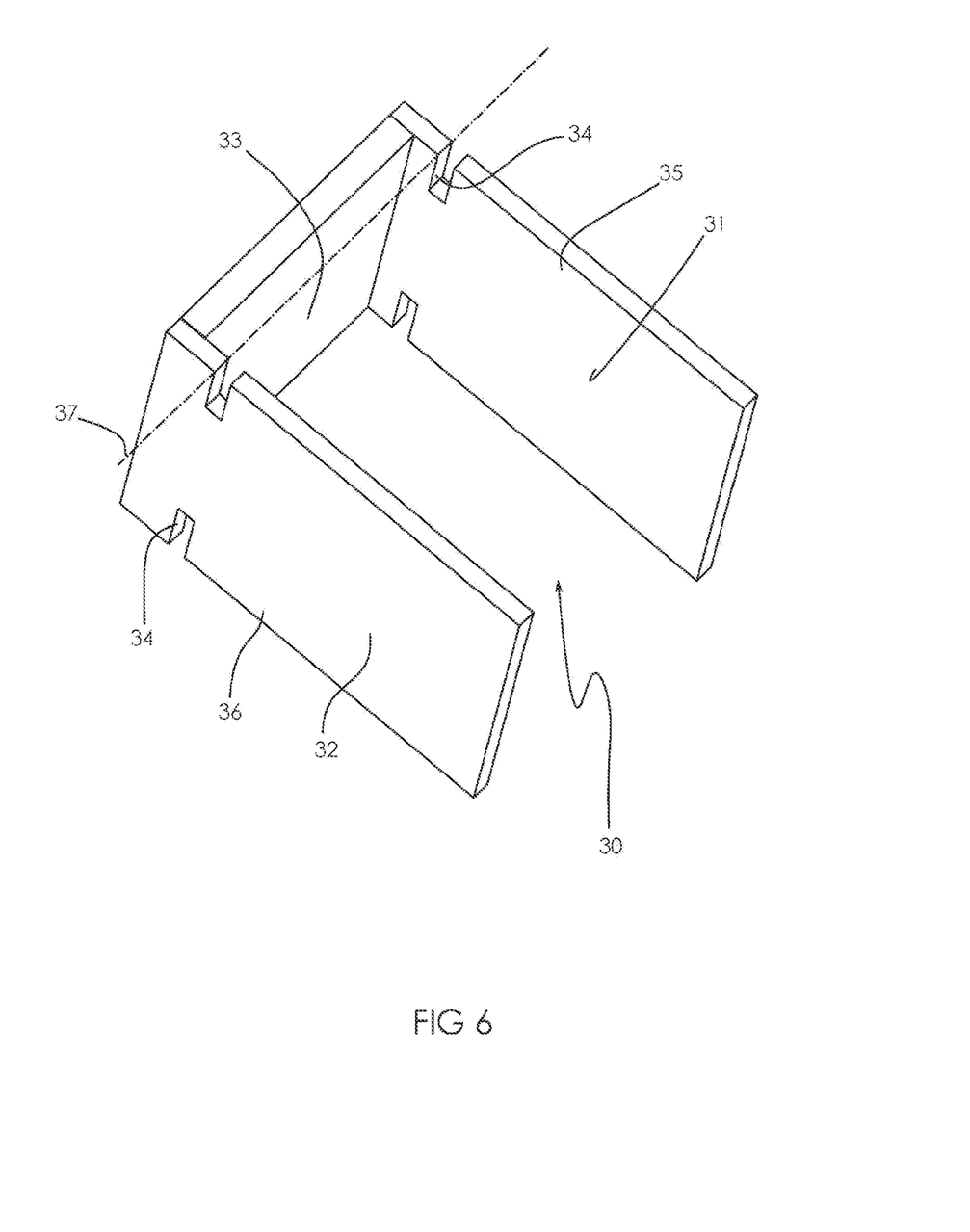
FIG. 6 is a top perspective view of a second embodiment of a module of the piece of furniture of the invention, with two side walls and a bottom wall assembled to the rear edges of the side walls.

The module 30 in FIG. 6 differs from the one in FIG. 3 only by its indentations. It comprises two side walls 31, 32 and a rear bottom wall 33. The bottom wall 33 does not comprise any grooves. Only notches 34 have been cut into the high 35 and low 36 edges of the side walls, below the bottom wall. The high and low notches are respectively aligned with each other parallel to the bottom wall, to, in fact, form partial, or dislocated, grooves along lines 37.

The notches 34 have the same dimensions as the notches 25 of modules 3, 4. The module 30 may fit onto the ribs 11, 12 of the boards 1, 2, but offset rearward with respect to the modules 3, 4.

In practice, many arrangements of the indentations and grooves in the modules and the ribs on the boards can be contemplated.

For example, if the ribs 11, 12 of the boards 1, 2 of the piece of furniture in FIG. 1 have their front flank coplanar with the rim 9 of the rear edge 6 of the boards, it is perfectly permissible to attach these ribs recessed with respect to this rim, that is below forward.

Depending on the configuration of the furniture to be made, everything is possible.

For example, a groove can be provided in one of the high and low edges of the bottom wall, extended by notches in the side walls and, without a groove in the other edge of the bottom wall, notches can be cut in the low or high edges of the side walls, opposite the grooved edge of the bottom wall.

Variations are also possible on the supporting boards of the modules of the piece of furniture of the invention of FIG. 1.

Figure 4:
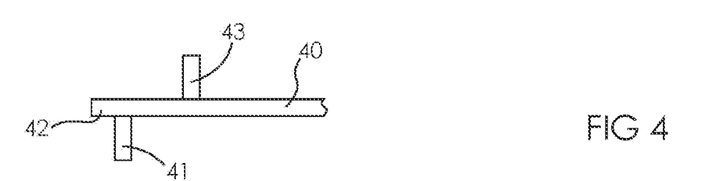
FIG. 4 is a partial view of the right side of a second embodiment of a board of the piece of furniture of the invention.

FIG. 4 represents the rear part of a board 40 with, respectively on the two planar faces of the board, a lower rib 41, near its rear edge 42, configured to fit into the grooves of the modules disposed under the board, and an upper rib 43, offset forward with respect to the lower groove 41, configured to be fitted into grooves or notches of modules disposed above. In this case, the board 40 is an intermediate board of a piece of furniture with at least two rows of modules.

Figure 5:
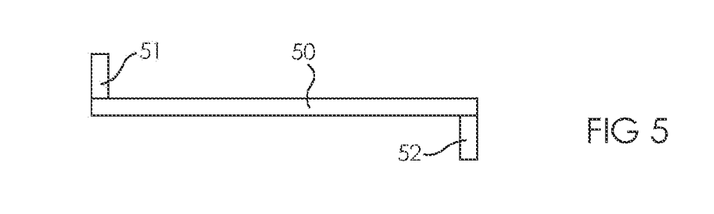
FIG. 5 is a view of the left side of a third embodiment of a board of the piece of furniture of the invention.

FIG. 5 represents a board 50 with, respectively on its two faces, an upper, or lower, rear, or front rib 51 and a lower, or upper, front, or rear rib 52, depending on the arrangement of the board in the piece of furniture. In this case, the board 50 is an intermediate board between two rows of modules open in opposite directions, some forward of the furniture, others towards the back.

It will be noticed that the ribs 51, 52 have a flank coplanar with the rim of the board edges.

The ribs 41, 43 of the board 40 and the ribs 51, 52 of the board 50, in profile, form an L with their board 40, 50.

Figure 7:
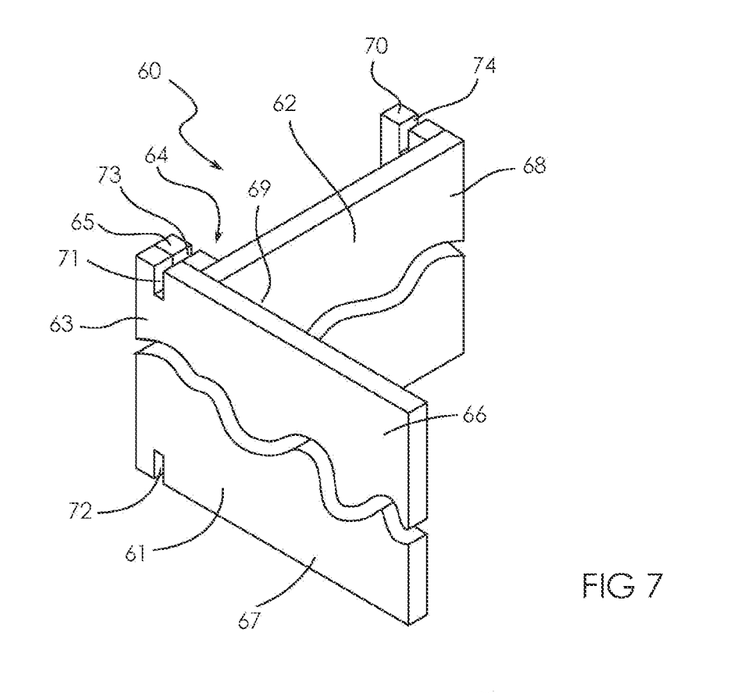
FIG. 7 is a top perspective view of a third embodiment of a module of the piece of furniture of the invention, with a single side wall, with a bottom wall assembled to the side wall below its rear edge, and made of wood.

The module 60 of FIG. 7, made of wood, differs from the previously described modules in that it comprises only a side wall 61 and a bottom wall 62 disposed below the vertical rear edge 63 of the side wall 61.

The two walls 61, 62, once assembled, form a rear assembly dihedral 64 in which is attached a buttress 65, in the shape of a beam with a rectangular section, extending between the high and low edges of the side wall (66, 67) and the bottom wall.

In addition, the vertical edge 68 of the wall 62, opposite its vertical assembly edge 69 is provided, here along its entire length, with a bar 70 for cooperation with the ribs of the high and low boards 2, 1. The bar 70 extends in line with the buttress beam 65.

The rear edge 63 of the side wall 61, projecting out of the bottom wall 62, comprises two longitudinal notches 71, 72 made in the high 66 and low 67 edges of the side wall, which are extended by notches 73 and 74 made in the high part (as well as in the low part) of the buttress beam 65 and of the bar 70, respectively aligned with each other, to form longitudinally, that is parallel to the bottom board 62, partial grooves, or dislocated grooves, for cooperation with the ribs of the boards 1, 2. The notches 71-74 are of the same dimensions as the notches in the modules of FIGS. 1-3, 6.

Figure 8:
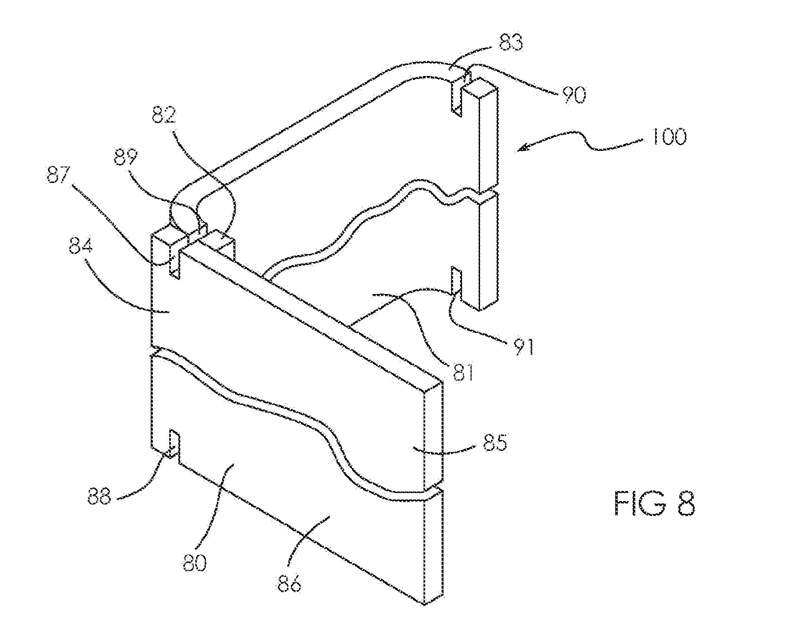
FIG. 8 is a top perspective view of a fourth embodiment of a module of the piece of furniture of the invention made of metal, with a single side wall, with a bottom wall welded to the rear edge of the side wall.

The module 100 in FIG. 8 is made of metal and consists of two side walls 80 and bottom wall 81, welded to each other.

The bottom wall 81 comprises a left assembly flange 82 and a right flange 83 opposite the side wall 80, both flanges being here bent substantially at right angles forward with respect to the bottom wall, by one of which flanges 82 the bottom wall 81 is welded to the vertical rear edge 84 of the side wall 80. In the example shown in FIG. 8, the bottom wall 81 extends directly perpendicular to the rear edge 84 of the side wall 80.

As in the previously described modules, the high 85 and low 86 edges of the rear edge 84 of the side wall 80 and the high and low edges of the two flanges 82, 83 of the bottom wall 81 respectively comprise notches 87-91 of the same dimensions and disposed and aligned in the same way as the notches of the previously described modules to cooperate in the same way with the ribs of the boards 1, 2.

It will be noted that making the module 100 is relatively easy, by cutting two walls, bending and welding.

Figure 9:
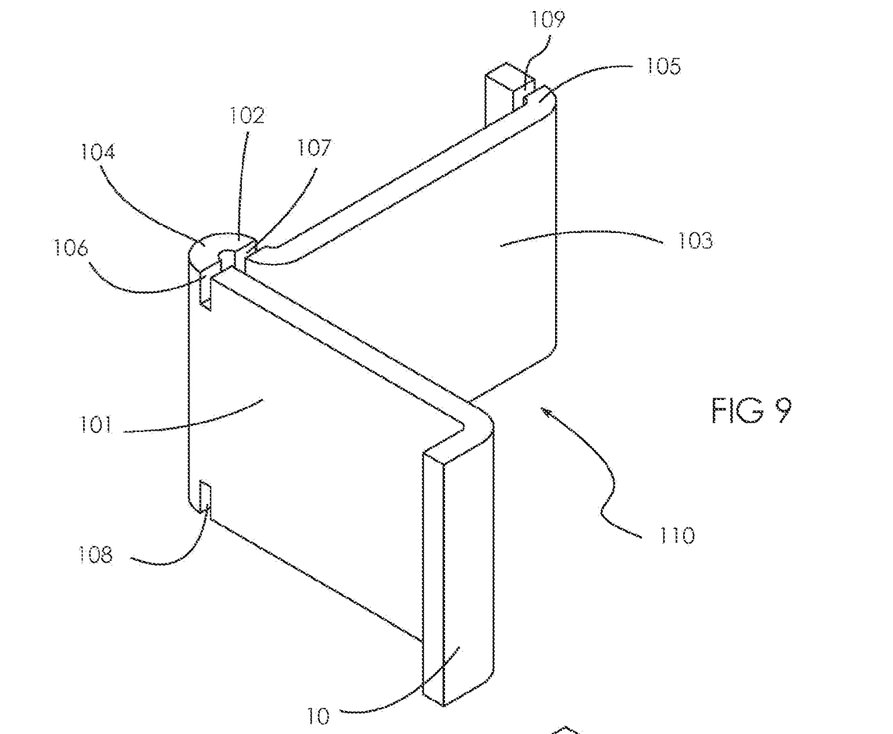
FIG. 9 is a top perspective view of a fifth embodiment of a module of the piece of furniture of the invention made of metal, with a single side wall and bottom wall formed in one piece.

The module 110 of FIG. 9 differs from the module of FIG. 8 by the fact that it is even easier to make, since a single plate cutout is sufficient. Thus, in a single plate 110, a first wall, forming the side wall 101 of the module, is first reserved, then, beyond this side wall, after a first bending substantially at 180° on a small portion of the plate, a thick rear and side bending and reinforcing ridge 102 is formed, then, beyond this ridge, after a second bending substantially to 90°, the bottom wall 103 of the module is formed, thus disposed below the vertical rear edge 104 of the ridge 102, also forming the rear edge of the side wall 101. The two walls 101, 103 are thus joined by the bending ridge 102.

The vertical edge 105, opposite the edge 102, of the bottom wall 103 has been bent substantially to 90° rearward to form a bar 105 disposed facing the ridge 102 and extending the bottom wall 103.

In the example shown in FIG. 9, the vertical front edge 105 opposite the rear edge 104 of the side wall 101 has also been bent substantially to 90° for stabilizing the module.

As in the module 100 of FIG. 8, notches 106-109 have been made in the high and low edges of the side wall 101, of the ridge 102 and of the bar 105, of the same dimensions and of the same arrangement as those of the other modules previously described, in order to perform the same functions of indentation and cooperation with the ribs of the boards 1, 2.

Several embodiments of the modules of the piece of furniture of the invention have been described, with particular bottom wall and side wall assemblies. Of course, these assemblies should not be considered as limiting the scope of the present application. Other assemblies are perfectly possible. For example, the assembly of a bottom wall and a side wall could be made by interlocking the rear edge of a side wall in a slot formed in a side edge of the bottom wall, made by three 90° bends if the module is made of metal, or by interlocking a side edge of the bottom wall bent to 90° in a slot formed in the rear edge of the side wall, made by two 90° bends if the module is made of metal.

Figure 10:
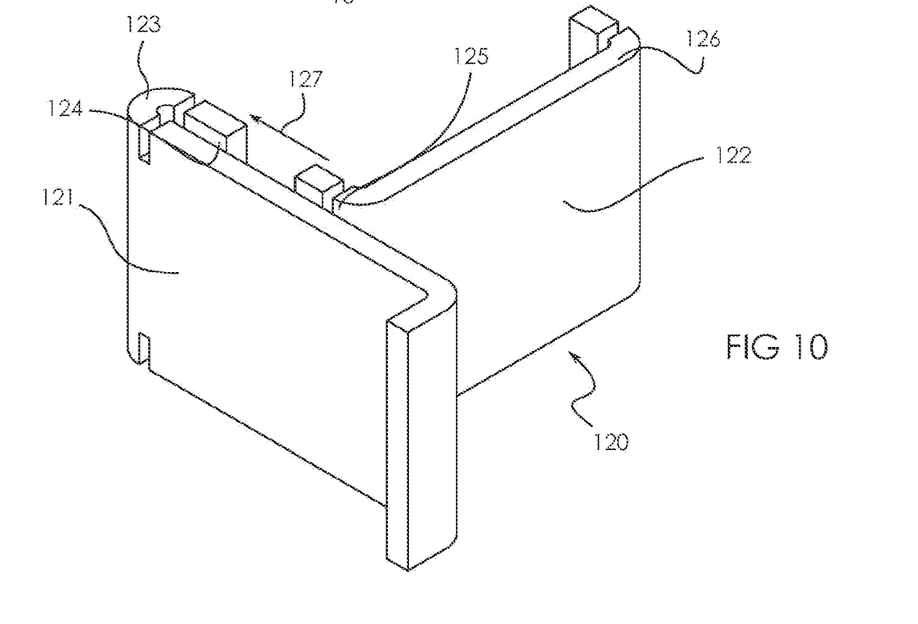
FIG. 10 is a top perspective view of a sixth embodiment of a module of the piece of furniture of the invention made of metal, with a single side wall and a bottom wall interlocked into the bent rear edge of the side wall

Thus, the module 120 of FIG. 10, also made of metal, consists of a side wall 121 and a bottom wall 122, first separated, as in the module 100 of FIG. 8, and then joined by interlocking to have a configuration very similar to that of the module 110 of FIG. 9. This is a particularly simple embodiment to implement.

The side wall 121 comprises a vertical rear edge 123 that has been bent forward along two 90° bends to form a vertical track 124 into which a vertical side edge 125, here left, bent to 90° from the bottom wall and rearward, is to be slid, or interlocked (127), to secure the two walls together.

The other vertical side edge 126, here right, of the bottom wall 122 has also been bent to 90° from the bottom wall and rearward in line with the other edge 125.

As in modules 100 and 110, notches have been formed to provide the same functions.

The invention claimed is:
1. A modular and scaleable piece of furniture comprising:
a low board and a high board, which is located above elevation-wise the low board; each of the low board and the high board having a front edge, a rear edge, and two spaced apart side edges located between the front and rear edges;
a module with at least one side wall and a rear bottom wall assembled to the at least one side wall, said at least one side wall having a low edge and a high edge and the rear bottom wall having a low edge and a high edge;
wherein the module is guided by the low and high boards when slid relative to the low and high boards; and wherein:
each of the low and high boards having two parallel planar surfaces;
a low longitudinal rib projecting perpendicularly to the two parallel planar surfaces of the low board and a high longitudinal rib projecting perpendicularly to the two parallel planar surfaces of the high board, and
the module is located between the low and high boards, is fitted onto the low and high longitudinal ribs, and is slidable along the low and high longitudinal ribs between the two spaced apart side edges of the low and high boards.

2. The piece of furniture according to claim 1, wherein the low longitudinal rib is located adjacent the rear edge of the low board.

3. The piece of furniture according to claim 1, wherein the low longitudinal rib and the low board form an L-shaped profile.

4. The piece of furniture according to claim 3, wherein the furniture comprises only one row of modules.

5. The piece of furniture according to claim 1, wherein the low longitudinal rib projects perpendicularly above and below the two parallel planar surfaces of the low board to form a T-shaped profile, the high longitudinal rib projects perpendicularly above and below the two parallel planar surfaces of the high board to form a T-shaped profile, or both the low and high longitudinal ribs project perpendicularly above and below the two parallel planar surfaces of the low board and the high board to form spaced apart T-shaped profile.

6. The piece of furniture according to claim 1, wherein at least one of the low board and the high board has a second longitudinal rib spaced from the low longitudinal rib and the high longitudinal rib.

7. The piece of furniture according to claim 6, wherein the second longitudinal rib is attached near the rear edge of said at least one of the low board and the high board.

8. The piece of furniture according to claim 1, wherein each of the low and high ribs has a front flank that is coplanar with a rim of the rear edge of respective low and high boards.

9. The piece of furniture according to claim 1, wherein, the rear bottom wall is assembled to the rear edge of the side wall, the module is indented in two longitudinal grooves formed respectively in the low and high edges of the rear bottom wall and extending into the low and high edges of the side wall to cooperate with the low and high longitudinal ribs of the low and high boards.

10. The piece of furniture according to claim 1, wherein the at least one side wall is a first side wall and the module comprises a second side wall, each of the first and second side walls provided with two low and high edges, and the rear bottom wall has two low and high edges and the rear bottom wall is assembled to the first and second side walls.

11. The piece of furniture according to claim 10, wherein the module is indented in at least one longitudinal groove for cooperation with one of the longitudinal ribs formed in the rear bottom wall and extended by notches in the side walls for cooperation with a rib.

12. The piece of furniture according to claim 10, wherein the module is indented only by notches formed in the two side walls of the module.

13. The piece of furniture according to claim 1, wherein, the module comprises only one side wall and the rear bottom wall is assembled to the only one side wall below the rear edge.

14. The piece of furniture according to claim 13, wherein the only one side wall and the rear bottom wall are made of metal and welded to each other.

15. The piece of furniture according to claim 14, wherein the rear bottom wall extends directly perpendicular to the rear edge of the only one side wall and comprises, opposite the side wall, a flange bent substantially at right angles forward with respect to the bottom wall.

16. The piece of furniture according to claim 13, wherein the only one side wall and the rear bottom wall are formed in a single metal plate.

17. The piece of furniture according to claim 16, wherein the single metal plate extends below the vertical rear edge of the only one side wall and a bending ridge joining the two walls.

18. The piece of furniture according to claim 13, wherein the module comprises a rear dihedral for assembling the rear bottom wall and the only one side wall, a buttress beam extends in the dihedral between the high and low edges of the rear bottom wall and the only one side wall, the beam being indented in two longitudinal notches formed respectively in the high and low edges and extending into the rear edge of the only one side wall, projecting out of the rear bottom wall to cooperate with the longitudinal ribs of the high and low boards.

19. The piece of furniture according to claim 18, wherein the edge of the rear bottom wall is provided with a bar extending in line with the buttress beam and arranged to cooperate with the longitudinal ribs of the high and low boards by high and low indentations.

20. The piece of furniture according to claim 1, wherein the low and high boards and the module are made of wood.

21. The piece of furniture according to claim 1, wherein the low and high boards and the module are made of metallic material.

22. The piece of furniture according to claim 1, further comprising a third board spaced from the low and high boards and a second module.

23. The piece of furniture according to claim 1, wherein, the module is made of metal and comprising only one side wall, the rear bottom wall is assembled to the only one side wall by interlocking a vertical side edge of the rear bottom wall into a track of a bent vertical rear edge of the only one side wall.

24. A modular and scaleable piece of furniture comprising:
a low board and a high board, which is located above elevation-wise the low board; each of the low board and the high board having two parallel planar surfaces, a front edge, a rear edge, a first side edge between the front edge and the rear edge, and a second side edge opposite the first side edge;
a module comprising a side wall and a rear bottom wall assembled to the side wall, said side wall having a low edge and a high edge and said rear bottom wall having a low edge and a high edge;
a low longitudinal rib projecting perpendicularly to the two parallel planar surfaces of the low board and a high longitudinal rib projecting perpendicularly to the two parallel planar surfaces of the high board, and
wherein the module is located between the low and high boards and is slidable between the first side edge and the second side edge of the low and high boards such that the low and high longitudinal ribs are located, respectively, in low and high notches formed with the module to guide the module along the low and high longitudinal ribs as the module is slid relative to the low and high boards.

25. The module and scaleable piece of furniture of claim 24, wherein the low and high notches are located on the side wall of the module.

26. The module and scaleable piece of furniture of claim 25, wherein the low longitudinal rib has two side edges and a continuous body extending between the two side edges.

27. A modular and scaleable piece of furniture comprising:
- a low board and a high board, which is located above elevation-wise the low board; each of the low board and the high board having two parallel planar surfaces, a front edge, a rear edge, a first side edge between the front edge and the rear edge, and a second side edge opposite the first side edge;
- a module comprising a first side wall, a second side wall, and a rear bottom wall assembled to the first and second side walls, each of said first and second side walls having a low edge and a high edge and a low notch and a high notch, and said rear bottom wall having a low edge and a high edge;
- a low longitudinal rib projecting perpendicularly to the two parallel planar surfaces of the low board and a high longitudinal rib projecting perpendicularly to the two parallel planar surfaces of the high board, and
- wherein the module is located between the low and high boards and is slidable between the first side edge and the second side edge of the low and high boards such that the low and high longitudinal ribs are located, respectively, in the low and high notches to guide the module along the low and high longitudinal ribs as the module is slid relative to the low and high boards.

28. The module and scaleable piece of furniture of claim 27, wherein the module is a first module and further comprising a second module, wherein the second module is located between the low and high boards next to the first module and the second module is slidable between the first side edge and the second side edge of the low and high boards while the low and high longitudinal ribs are located, respectively, in low and high notches on the second module to guide the second module along the low and high longitudinal ribs as the second module is slid relative to the low and high boards.

* * * * *